US012226807B2

(12) United States Patent
Wang et al.

(10) Patent No.: US 12,226,807 B2
(45) Date of Patent: Feb. 18, 2025

(54) CLEANING DEVICE FOR CLEANING ELECTROPLATING SUBSTRATE HOLDER

(71) Applicant: TAIWAN SEMICONDUCTOR MANUFACTURING COMPANY LIMITED, Hsin-Chu (TW)

(72) Inventors: Yu-Young Wang, New Taipei (TW); Chung-En Kao, Miaoli County (TW); Victor Y. Lu, Foster City, CA (US)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 17/885,360

(22) Filed: Aug. 10, 2022

(65) Prior Publication Data

US 2022/0379356 A1 Dec. 1, 2022

Related U.S. Application Data

(62) Division of application No. 16/429,470, filed on Jun. 3, 2019, now Pat. No. 11,433,440, which is a division of application No. 14/839,625, filed on Aug. 28, 2015, now Pat. No. 10,307,798.

(51) Int. Cl.

| | |
|---|---|
| ***B08B 17/02*** | (2006.01) |
| ***B08B 3/02*** | (2006.01) |
| ***C25D 21/08*** | (2006.01) |
| *C25D 17/06* | (2006.01) |
| *C25D 21/00* | (2006.01) |

(52) U.S. Cl.

CPC .............. *B08B 17/025* (2013.01); *B08B 3/02* (2013.01); *C25D 21/08* (2013.01); *B08B 2203/0229* (2013.01); *C25D 17/06* (2013.01); *C25D 21/00* (2013.01)

(58) Field of Classification Search

CPC ......... B08B 3/02; B08B 17/025; B08B 9/023; B08B 2203/0229; C25D 17/00; C25D 21/08; C25D 21/00

See application file for complete search history.

(56) References Cited

U.S. PATENT DOCUMENTS 5,608,943 A * 3/1997 Konishi ............ H01L 21/67051 15/302
5,993,547 A 11/1999 Sato
6,770,149 B2 * 8/2004 Satou ...................... B05C 11/08 134/36

(Continued)

FOREIGN PATENT DOCUMENTS

TW 201402874 A 1/2014
WO 2013148890 A1 10/2013

*Primary Examiner* — Michael E Barr
*Assistant Examiner* — Kevin G Lee
(74) *Attorney, Agent, or Firm* — Cooper Legal Group, LLC

(57) ABSTRACT

A cleaning device for removing contamination on a substrate holder used with an electroplating cell includes an arm, a cleaning agent supplier, a nozzle and a receiver. The cleaning agent supplier is coupled to the arm and configured to supply a cleaning agent. The nozzle is coupled to the cleaning agent supplier and configured to spray the cleaning agent onto the substrate holder to remove the contamination. The receiver is coupled to the arm and configured to receive the cleaning agent after the cleaning agent is sprayed onto the substrate holder.

20 Claims, 9 Drawing Sheets

(56) References Cited

U.S. PATENT DOCUMENTS

| | | | | |
|---|---|---|---|---|
| 7,270,136 | B2 * | 9/2007 | Ko | B08B 7/0092 257/E21.228 |
| 9,214,363 | B2 * | 12/2015 | Kyouda | H01L 21/67051 |
| 2002/0066466 | A1 | 6/2002 | Tan | |
| 2013/0061875 | A1 | 3/2013 | Woodruff | |
| 2013/0292254 | A1 | 11/2013 | Kumar et al. | |
| 2014/0261163 | A1 * | 9/2014 | Kishita | H01L 21/68714 118/52 |

* cited by examiner

CLEANING DEVICE FOR CLEANING ELECTROPLATING SUBSTRATE HOLDER

RELATED APPLICATION

This application is a divisional of and claims priority to U.S. application Ser. No. 16/429,470, titled "CLEANING DEVICE FOR CLEANING ELECTROPLATING SUBSTRATE HOLDER" and filed on Jun. 3, 2019, which is a divisional of and claims priority to U.S. application Ser. No. 14/839,625, titled "CLEANING DEVICE FOR CLEANING ELECTROPLATING SUBSTRATE HOLDER" and filed on Aug. 28, 2015. U.S. application Ser. No. 16/429,470 and U.S. application Ser. No. 14/839,625 are incorporated herein by reference.

BACKGROUND

Electroplating has many applications. One very important developing application is in electroplating copper onto semiconductor wafers to form conductive copper lines for "wiring" individual devices of the integrated circuit. Often this electroplating process serves as a step in the damascene fabrication procedure.

For example, wafers are inserted in a substrate holder and then immersed into an electroplating bath to perform the electroplating process. After the electroplating process is completed, the wafers are removed from the electroplating bath. However, after electroplating of several batches of wafers, contamination is found on the substrate holder, which may induce inline gap-filling defects during the electroplating process, and thus to deteriorate the process yield. What is needed therefore is improved technology for removing the contamination on the substrate holder.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
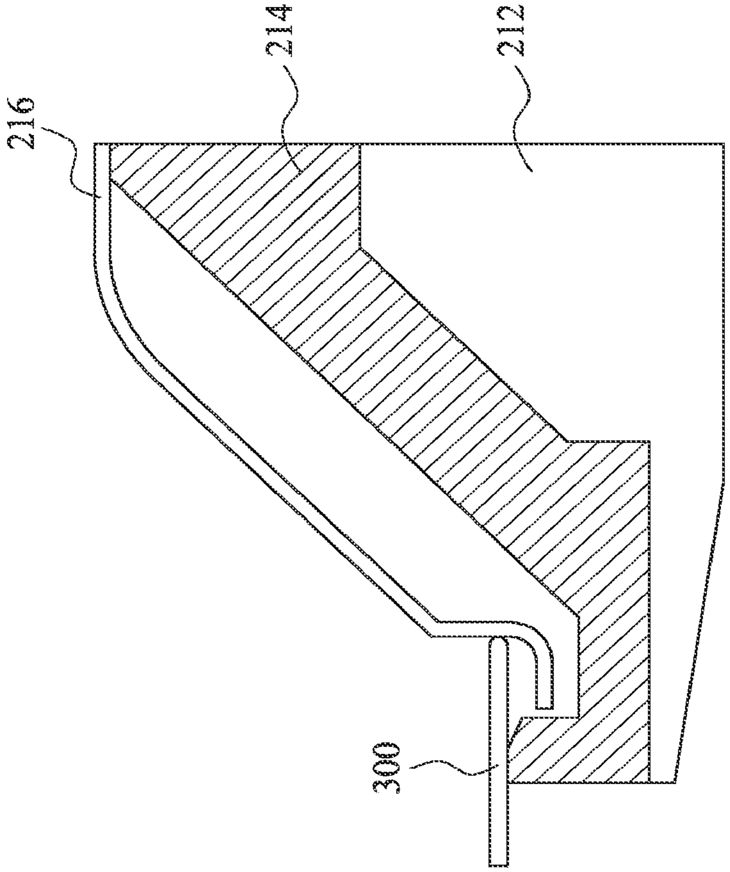
FIG. 1 is a cross-sectional view of a portion of a cup in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electrochemical deposition may be employed at various points in the integrated circuit fabrication and packaging processes. At the integrated circuit (IC) chip level, damascene features are created through electrodepositing copper within vias and trenches to form multiple interconnected metallization layers. However, after electrochemical deposition is performed on several batches of wafers, contamination is found on the substrate holder, which may induce inline gap-filling defects during the electrochemical deposition, and thus to deteriorate the process yield. Specifically, the contamination may be dropped into the vias or the trenches, which may result in the gap-filling defects. The contamination may be particles, unwanted deposits, recrystallized components (e.g., copper sulfate or a mixture of copper sulfate and additive) or other materials. What is needed therefore is improved technology for removing the contamination on the substrate holder.

Currently, the substrate holder is cleaned by immersing the substrate holder into the electroplating bath to remove the contamination on the substrate holder. Nevertheless, such cleaning process typically takes more than ten minutes. Furthermore, the cleaning process may be performed with high frequency, and thus will significantly lower wafer throughput per hour (WPH).

Therefore, the present disclosure provides a cleaning device for effectively removing contamination on a substrate holder used with an electroplating cell. In some embodiments, the cleaning process using the cleaning device takes less than or much less than ten minutes, and thus will improve the wafer throughput per hour (WPH). Embodiments of the electroplating cell, the substrate holder and the cleaning device are sequentially described in detail below.

In some embodiments, the electroplating cell (not shown) has an electroplating chamber, which may house an anode chamber and an electroplating solution. In some embodiments, the electroplating cell further includes other functional elements, such as a diffuser, an electroplating solution inlet tube, a rinse drain line, an electroplating solution return line, any other functional element or a combination thereof.

In some embodiments, the electroplating cell is included in an electroplating tool (not shown) for electroplating semiconductor wafers. Semiconductor wafers may be fed to the electroplating tool. A robot can retract and move the substrates in multiple dimensions from one station to another station. The electroplating tool may also include other modules configured to perform other necessary electroplating sub-processes, such as spin rinsing and drying, metal and silicon wet etching, pre-wetting and pre-chemical treating, photoresist stripping, surface pre-activation, etc.

The substrate holder is used with the electroplating cell. The substrate holder is configured to receive and support a substrate (e.g., a semiconductor wafer) during electroplating deposition. The term "substrate holder" may also be called as wafer holder, workpiece holder, clamshell holder, clamshell assembly and clamshell. In some embodiments, the substrate holder is Novellus Systems' Sabre® tool. In some embodiments, the substrate holder can be lifted vertically either up or down to immerse the substrate holder into the electroplating solution in the electroplating cell via an actuator.

In some embodiments, the substrate holder (not shown) includes two main components of a clamshell, which are a cup and a cone. In some embodiments, the cup is configured to provide a support upon which the substrate rests. In some embodiments, the cone is over the cup and configured to press down on a backside of the substrate to hold it in place. In some embodiments, the substrate holder further includes struts to support the cup and the cone. In some embodiments, the substrate holder is driven by a motor. In some embodiments, the substrate holder is driven by a motor via a spindle. In some embodiments, the spindle transmits torque from the motor to the substrate holder causing rotation of the substrate held therein during the electroplating process. In some embodiments, an air cylinder within the spindle also provides a vertical force for engaging the cup with the cone. In some embodiments, the substrate is loaded between the cone and the cup when the clamshell is disengaged. The cone is engaged with the cup after the substrate is loaded to engage the substrate against the periphery of the cup.

In some embodiments, the cup includes a cup bottom, a plurality of lip seals and a plurality of electrical contacts. In some embodiments, the lip seals and the electrical contacts surround the cup bottom, and the electrical contacts are over the lip seals.

FIG. 1 is a cross-sectional view of a portion of a cup in accordance with some embodiments of the present disclosure, which shows a portion of the cup bottom 212, one of the lip seals 214 and one of the electrical contacts 216. The cup and its components may have an annular shape and be sized to engage the periphery of a substrate 300 (e.g., a 200-mm wafer, a 300-mm wafer, a 450-mm wafer).

The cup bottom 212 is also referred to as a "disk" or a "base plate." The cup bottom 212 may be made of a stiff, corrosive resistant material, such as stainless steel, titanium, and tantalum. The cup bottom 212 may be removed (i.e., detached) to allow replacing various elements of the cup. The cup bottom 212 may have a tapered edge (not marked) at its innermost periphery, which is shaped in such ways as to improve flow characteristic of the electroplating solution around the edge.

During closing, the cup bottom 212 supports the lip seals 214 when the force is exerted through a substrate 300 to avoid clamshell leakage during the substrate 300 immersion. That is, the lip seals 214 are configured to engage with the edge of the substrate 300 and to form a seal between the substrate 300 and the lip seals 214 that protects the interior of the cup from the electroplating solution. In some embodiments, the lip seals 214 are made of an elastic material or any other suitable material.

The electrical contacts 216 are configured to establish electrical connection with conductive elements of the substrate 300. In some embodiments, the electrical contacts 216 are made of alloy or any other suitable material. In some embodiments, the electrical contacts 216 are flexible and may be pushed down (i.e., towards the tapered edge of the cup bottom 212) when the substrate 300 is loaded.

In order to effectively remove the contamination on the substrate holder (e.g., the lip seal 214, the electrical contact 216, the cup bottom 212 or a combination thereof of FIG. 1), the present disclosure provides embodiments of the cleaning device described in detail below.

In some embodiments, the cleaning device is an auto-clean-etch (ACE) module and exhibits multiple process capability and high contamination removal efficiency, and thus able to maintain stable peak current during the electroplating process and to reduce gap-filling defects and to improve wafer throughput per hour (WPH). For example, the multiple process capability may include multiple selections of the cleaning agent and multiple parameters (e.g., order, temperature) of the cleaning process.

Figure 2:
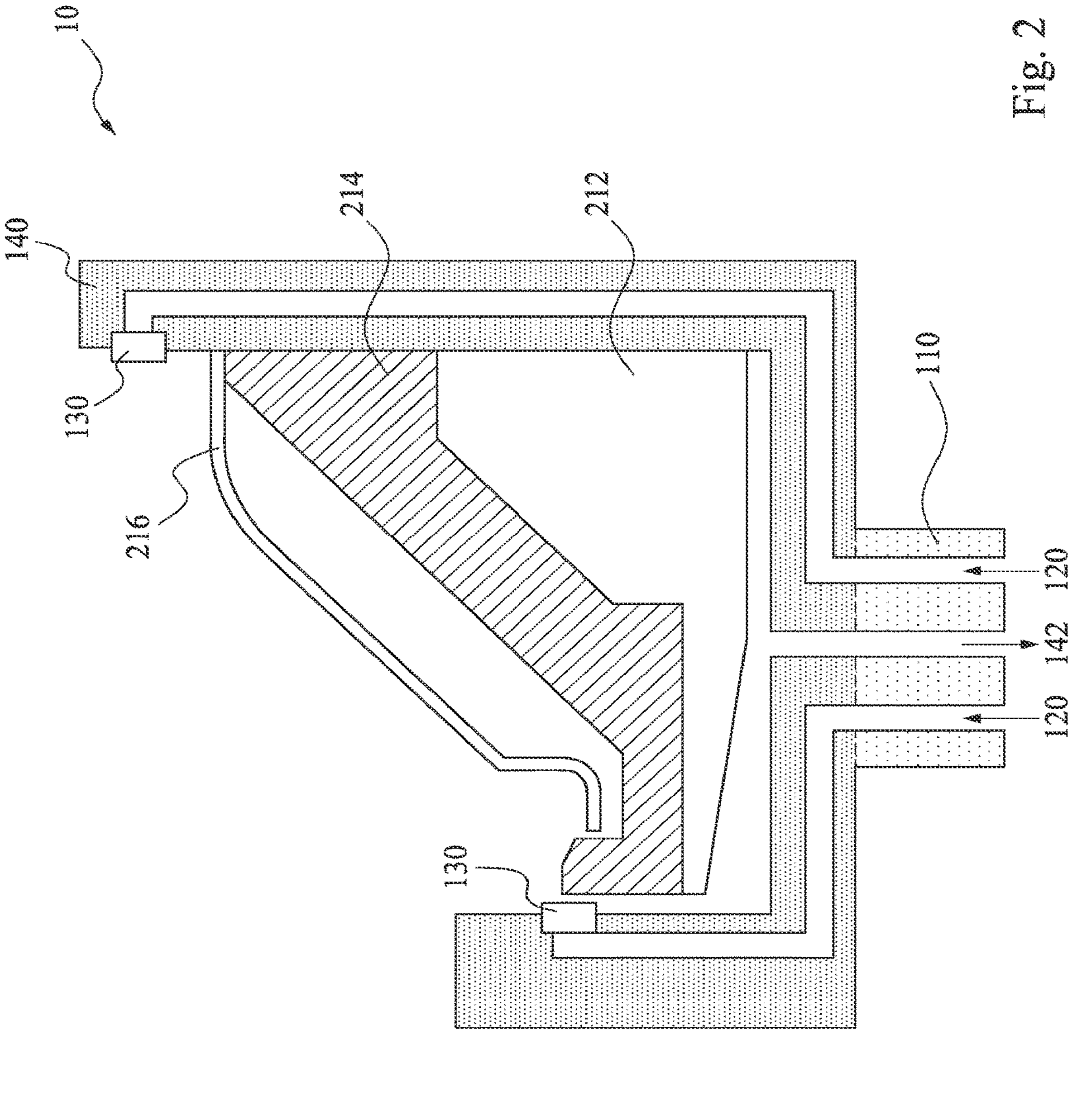
FIG. 2 is a cross-sectional view of a cleaning device in accordance with some embodiments of the present disclosure.

FIG. 2 is a cross-sectional view of a cleaning device 10 in accordance with some embodiments of the present disclosure. As shown in FIG. 2, the cleaning device 10 includes an arm 110, a cleaning agent supplier 120, a nozzle 130 and a receiver 140 (or called as accommodator).

In some embodiments, the arm 110 is coupled to the nozzle 130 and configured to position the nozzle 130 to effectively remove the contamination on the substrate holder (e.g., the lip seal 214, the electrical contact 216, the cup bottom 212 or a combination thereof). In some embodiments, the arm 110 is positioned by a controller (not shown). In some embodiments, the arm 110 is able to move or rotate.

In some embodiments, the arm 110 is coupled to the cleaning agent supplier 120. In some embodiments, the arm 110 is coupled to the receiver 140. In some embodiments, the arm 110 is connected to the receiver 140. In some embodiments, as shown in FIG. 2, the arm 110 is connected to a bottom (not marked) of the receiver 140. In some embodiments, the arm 110 and the receiver 140 are integrally molded. In other embodiments, the arm is connected to a sidewall of the receiver. In other embodiments, the arm includes a vertical portion and a connected portion connected between the vertical portion and the receiver. In some embodiments, the vertical portion is coupled to a controller.

In some embodiments, the cleaning agent supplier 120 is configured to supply a cleaning agent. In some embodiments, the cleaning agent supplier 120 includes one or more piping lines (not marked) for transferring the cleaning agent to one or more nozzles 130. In some embodiments, the cleaning agent supplier 120 is embedded in the arm 110, as shown in FIG. 2. In some embodiments, the cleaning agent supplier 120 is embedded in the receiver 140, as shown in FIG. 2. In other embodiments, the receiver has a through hole, and the cleaning agent supplier (e.g, a piping line) is inserted in the through hole.

In some embodiments, the cleaning agent supplied from the cleaning agent supplier 120 includes acid, dry solvent, inert gas, any other suitable material or a combination thereof. In some embodiments, the acid is used to dissolve or etch the contamination. In some embodiments, the acid includes organic acid, inorganic acid or a combination thereof. In some embodiments, the inorganic acid includes sulfuric acid, hydrochloric acid, nitric acid, any other suitable inorganic acid or a combination thereof. In some embodiments, the dry solvent includes isopropyl alcohol (IPA), acetone, methyl ethyl ketone (MEK), any other suitable dry solvent or a combination thereof. In some embodiments, the inert gas includes nitrogen, argon, helium, any other suitable inert gas or a combination thereof.

In some embodiments, the nozzle 130 is configured to spray the cleaning agent onto the substrate holder (e.g., the lip seal 214, the electrical contact 216, the cup bottom 212 or a combination thereof) to remove the contamination. In some embodiments, the nozzle 130 is coupled to the cleaning agent supplier 120. In some embodiments, the nozzle 130 is connected to the cleaning agent supplier 120, as shown in FIG. 2. In some embodiments, the nozzle 130 is acted as an outlet of the cleaning agent supplier 120, as shown in FIG. 2. In some embodiments, the nozzle 130 has various spray directions. In some embodiments, the spray direction of the nozzle 130 is adjustable. In some embodiments, the nozzle 130 is on the receiver 140. In some embodiments, the nozzle 130 is on a sidewall (not marked) of the receiver 140, as shown in FIG. 2. In some embodiments, the nozzle 130 is embedded (or inserted) in the receiver 140.

In some embodiments, the receiver 140 is configured to receive the cleaning agent after the cleaning agent is sprayed onto the substrate holder (e.g., the lip seal 214, the electrical contact 216, the cup bottom 212 or a combination thereof) to avoid contamination of the electroplating solution. In some embodiments, the receiver 140 is configured to surround the lip seal 214. In some embodiments, the receiver 140 is configured to surround the lip seal 214 and the electrical contact 216. In some embodiments, the receiver 140 is a sink, which can be used to accommodate a portion of the substrate holder (e.g., the lip seal 214, the electrical contact 216, the cup bottom 212 or a combination thereof). In some embodiments, the receiver 140 includes a vent 142 on the receiver 140 and configured to suck up the cleaning agent to avoid overflow of the cleaning agent. In some embodiments, the vent 142 is on a bottom surface of the receiver 140. In some embodiments, the vent 142 is embedded (or inserted) in a bottom of the receiver 140.

Figure 3A:
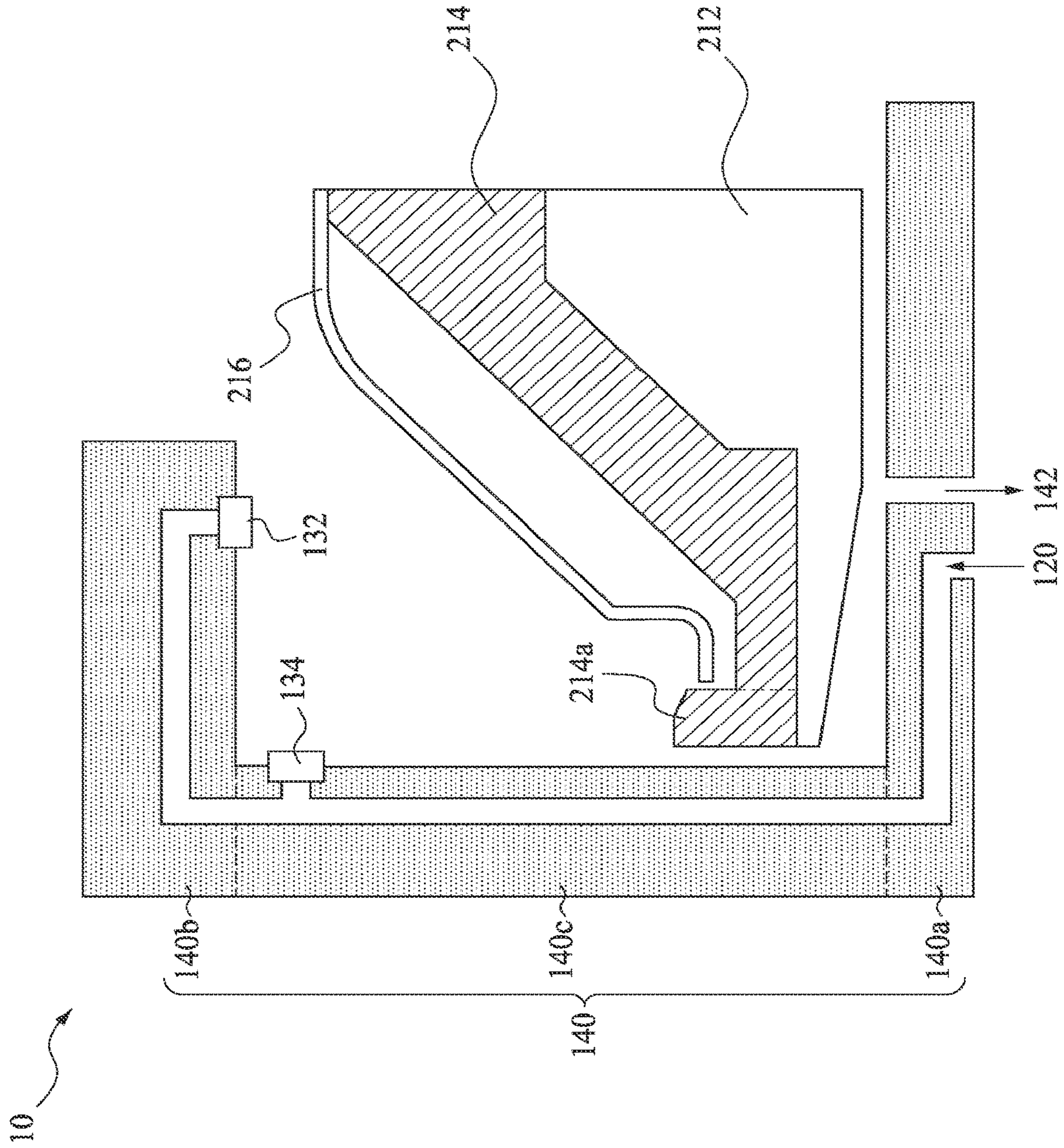
FIG. 3A is a cross-sectional view of a cleaning device in accordance with some embodiments of the present disclosure.

FIG. 3A is a cross-sectional view of a cleaning device 10 in accordance with some embodiments of the present disclosure. As shown in FIG. 3A, the cleaning device 10 includes a receiver 140, a cleaning agent supplier 120, a first nozzle 132 and a second nozzle 134.

In some embodiments, the receiver 140 is configured to receive a cleaning agent after the cleaning agent is sprayed onto a substrate holder (e.g., a lip seal 214, a electrical contact 216, a cup bottom 212 or a combination thereof) to avoid contamination of the electroplating solution. The receiver 140 may be designed to various shapes according to the shape of a portion of the substrate holder (e.g., the lip seal 214, the electrical contact 216, the cup bottom 212 or a combination thereof) and/or other considerations. In some embodiments, the receiver 140 includes a bottom 140*a*, a ceiling 140*b* and a sidewall 140*c* connected between the bottom 140*a* and the ceiling 140*b*, as shown in FIG. 3A.

In some embodiments, the receiver 140 includes a vent 142 on the receiver 140 and configured to suck up the cleaning agent to avoid overflow of the cleaning agent. In some embodiments, the vent 142 is on the bottom 140*a* of the receiver 140. In some embodiments, the vent 142 is embedded (or inserted) in the bottom 140*a* of the receiver 140.

In some embodiments, the cleaning agent supplier 120 is configured to supply the cleaning agent. In some embodiments, the cleaning agent supplier 120 includes one or more piping lines (not marked) for transferring the cleaning agent to the first and second nozzles 132, 134. In some embodiments, the cleaning agent supplier 120 is embedded in the receiver 140, as shown in FIG. 3A. In other embodiments, the receiver has a through hole, and the cleaning agent supplier (e.g, a piping line) is inserted in the through hole.

In some embodiments, the first nozzle 132 is on the ceiling 140*b* of the receiver 140 and coupled to the cleaning agent supplier 120 to spray the cleaning agent onto the lip seal 214. In some embodiments, the second nozzle 134 is on the sidewall 140*c* of the receiver 140 and coupled to the cleaning agent supplier 120 to spray the cleaning agent onto the lip seal 214.

Figure 3B:
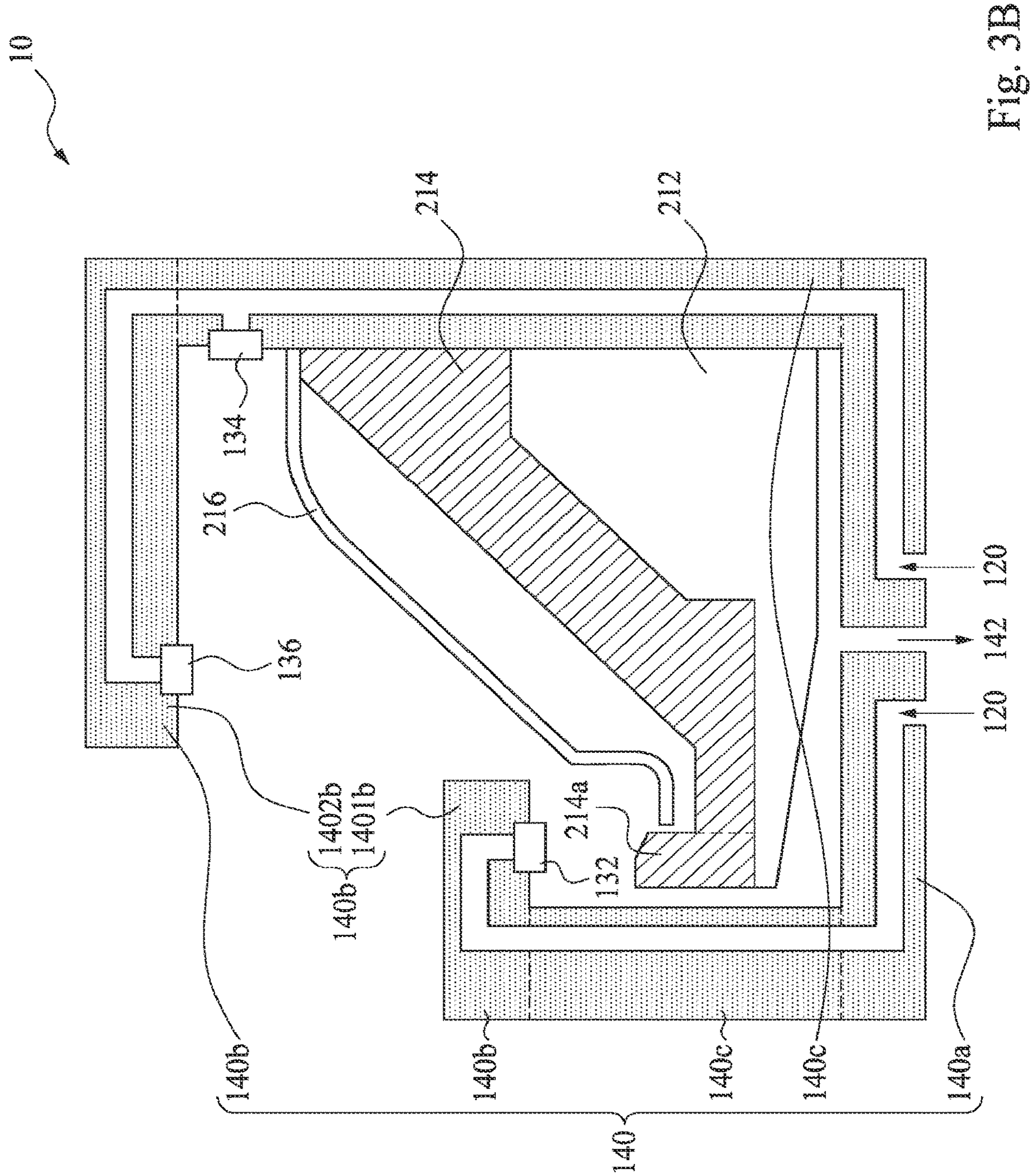
FIG. 3B is a cross-sectional view of a cleaning device in accordance with some embodiments of the present disclosure.

FIG. 3B is a cross-sectional view of a cleaning device 10 in accordance with some embodiments of the present disclosure. As shown in FIG. 3B, the cleaning device 10 includes a receiver 140, a cleaning agent supplier 120, a first nozzle 132 and a second nozzle 134.

In some embodiments, the receiver 140 is configured to receive a cleaning agent after the cleaning agent is sprayed onto a substrate holder (e.g., a lip seal 214, a electrical contact 216, a cup bottom 212 or a combination thereof) to avoid contamination of the electroplating solution. The receiver 140 may be designed to various shapes according to the shape of a portion of the substrate holder (e.g., the lip seal 214, the electrical contact 216, the cup bottom 212 or a combination thereof) and/or other considerations. In some embodiments, the receiver 140 includes a bottom 140*a*, a ceiling 140*b* and a sidewall 140*c* connected between the bottom 140*a* and the ceiling 140*b*, as shown in FIG. 3B. In some embodiments, the ceiling 140*b* includes a first portion 1401*b* and a second portion 1402*b*. In some embodiments, the second portion 1402*b* is higher than the first portion 1401*b* to fit the shape of a lip seal 214.

In some embodiments, the receiver 140 includes a vent 142 on the receiver 140 and configured to suck up the cleaning agent to avoid overflow of the cleaning agent. In some embodiments, the vent 142 is on the bottom 140*a* of the receiver 140. In some embodiments, the vent 142 is embedded (or inserted) in the bottom 140*a* of the receiver 140.

In some embodiments, the cleaning agent supplier 120 is configured to supply the cleaning agent. In some embodiments, the cleaning agent supplier 120 includes one or more piping lines (not marked) for transferring the cleaning agent to the first and second nozzles 132, 134. In some embodiments, the cleaning agent supplier 120 is embedded in the receiver 140, as shown in FIG. 3B. In other embodiments, the receiver has a through hole, and the cleaning agent supplier (e.g, a piping line) is inserted in the through hole.

In some embodiments, the first nozzle 132 is on the first portion 1401*b* of the ceiling 140*b* of the receiver 140 and coupled to the cleaning agent supplier 120 to spray the cleaning agent onto the lip seal 214. In some embodiments, the second nozzle 134 is on the sidewall 140*c* of the receiver 140 and coupled to the cleaning agent supplier 120 to spray the cleaning agent onto the lip seal 214.

In some embodiments, the cleaning device 10 further includes a third nozzle 136 on the second portion 1402*b* of the ceiling 140*b* of the receiver 140. The first, second and third nozzles 132, 134 and 136 may align with different portions of the lip seal 214. In other embodiments, a plurality of nozzles may align with a same portion of the lip seal. It is noted that, the amount, the position and the spray direction of the nozzles may be altered in practical applications.

In some embodiments, the lip seal 214 includes a lip portion 214*a* configured to be against a substrate (e.g., the substrate 300 of FIG. 1). In some embodiments, the first nozzle 132 is substantially or entirely aligned with the lip portion 214*a* to effectively remove the contamination of the lip portion 214*a*. In some embodiments, the first portion 1401*b*, the sidewall 140*c* and the bottom 140*a* surround the lip portion 214*a*.

Figure 4:
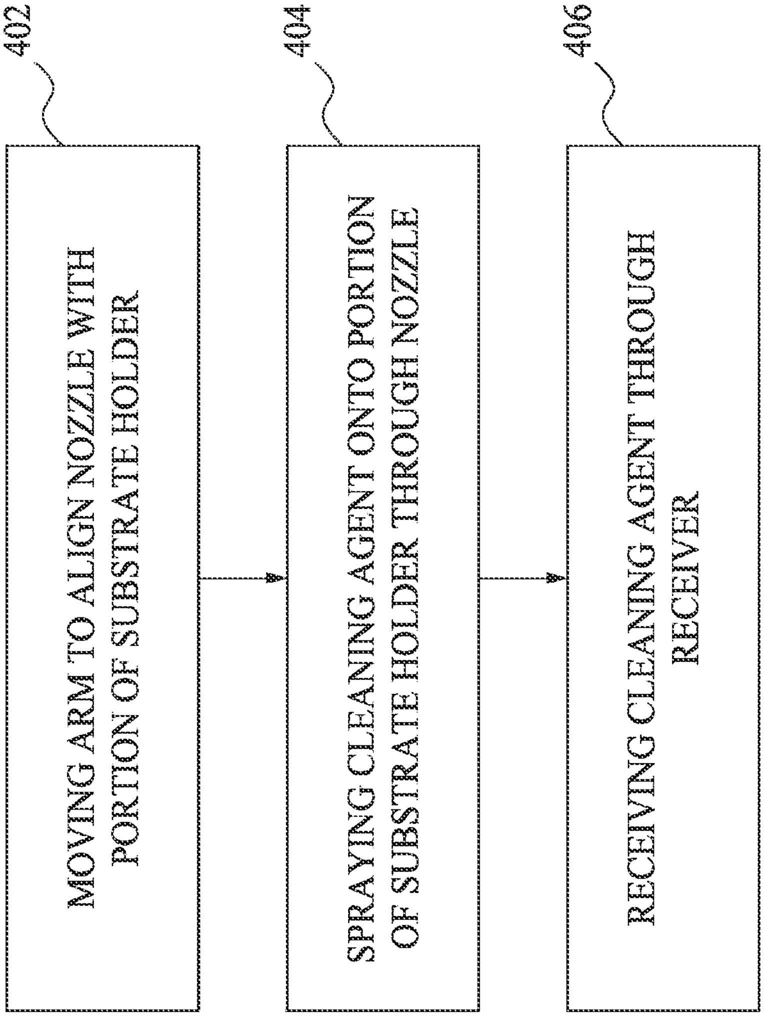
FIG. 4 is an illustrative flowchart of a method of removing contamination on a substrate holder in accordance with some embodiments of the present disclosure.

FIG. 4 is an illustrative flowchart of a method of removing contamination on a substrate holder in accordance with some embodiments of the present disclosure. In operation 402, as shown in FIG. 2, the arm 110 is moved to align the nozzle 130 with a portion of the substrate holder (e.g., the lip seal 214, the electrical contact 216, the cup bottom 212 or a combination thereof). In some embodiments, the arm 110 is moved using a controller. In some embodiments, during, before or after the arm 110 is moved, the substrate holder is also moved to help the alignment between the nozzle 130 and the portion of the substrate holder.

FIGS. 5A-5D are schematic diagrams of aligning a cleaning device 10 with a portion of a substrate holder 20 in accordance with some embodiments of the present disclosure. In some embodiments, the substrate holder 20 shown in FIGS. 5A-5D is simply depicted for clarity. In some embodiments, the substrate holder includes a cup. In some embodiments, the cup includes a cup bottom, lip seals and electrical contacts, as shown in FIG. 1.

As shown in FIGS. 5A-5D, the cleaning device 10 includes an arm 110, a receiver 140, nozzle(s) and cleaning agent supplier(s), and the nozzle(s) and cleaning agent supplier(s) are not shown for simplicity and clarity. In some embodiments, the arm 110 includes a vertical portion (not marked) and a connected portion (not marked) connected between the vertical portion and the receiver 140. In some embodiments, the vertical portion is coupled to a controller. In some embodiments, the receiver 140 is substantially arc-shaped in top view to fit the portion of the substrate holder 20. In some embodiments, a sidewall (not marked) of the receiver 140 has different heights. The three dimensional shape of the receiver 140 may be designed according to the shape of the portion of the substrate holder, the position of the nozzle(s) and/or other considerations.

Figure 5A:
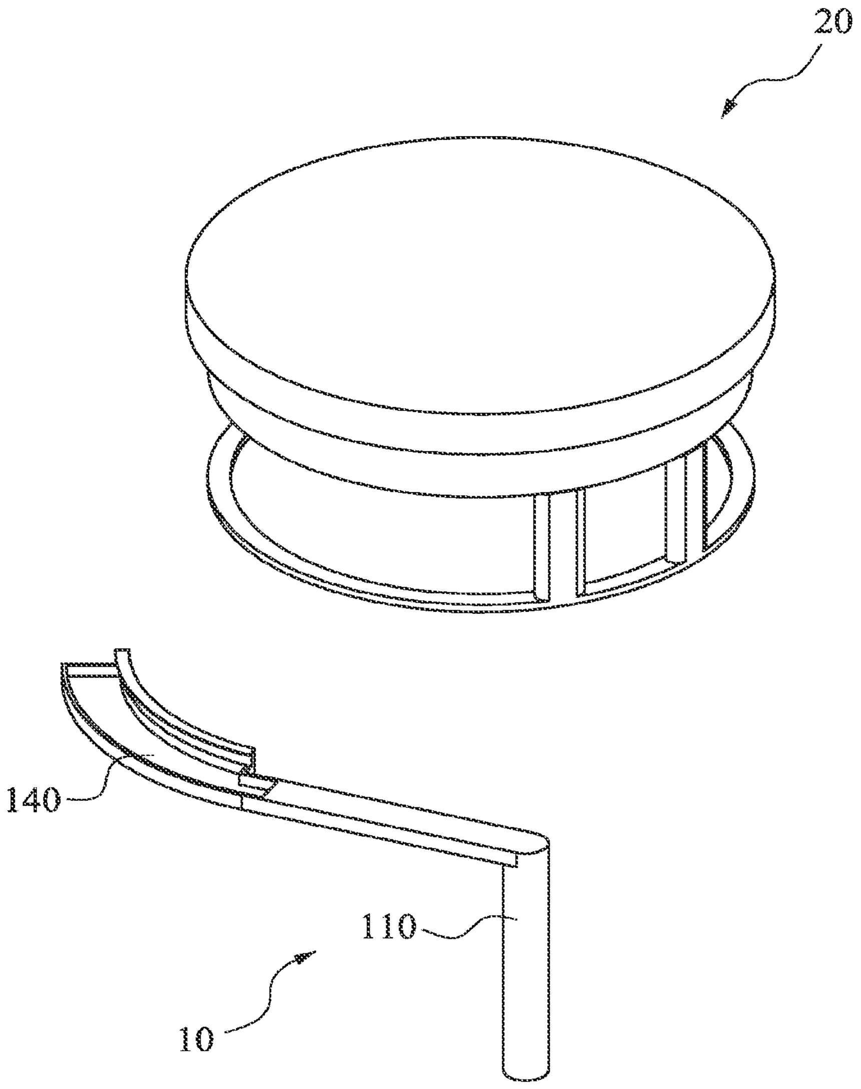
FIGS. 5A-5D are schematic diagrams of aligning a cleaning device with a portion of a substrate holder in accordance with some embodiments of the present disclosure.
Figure 5B:
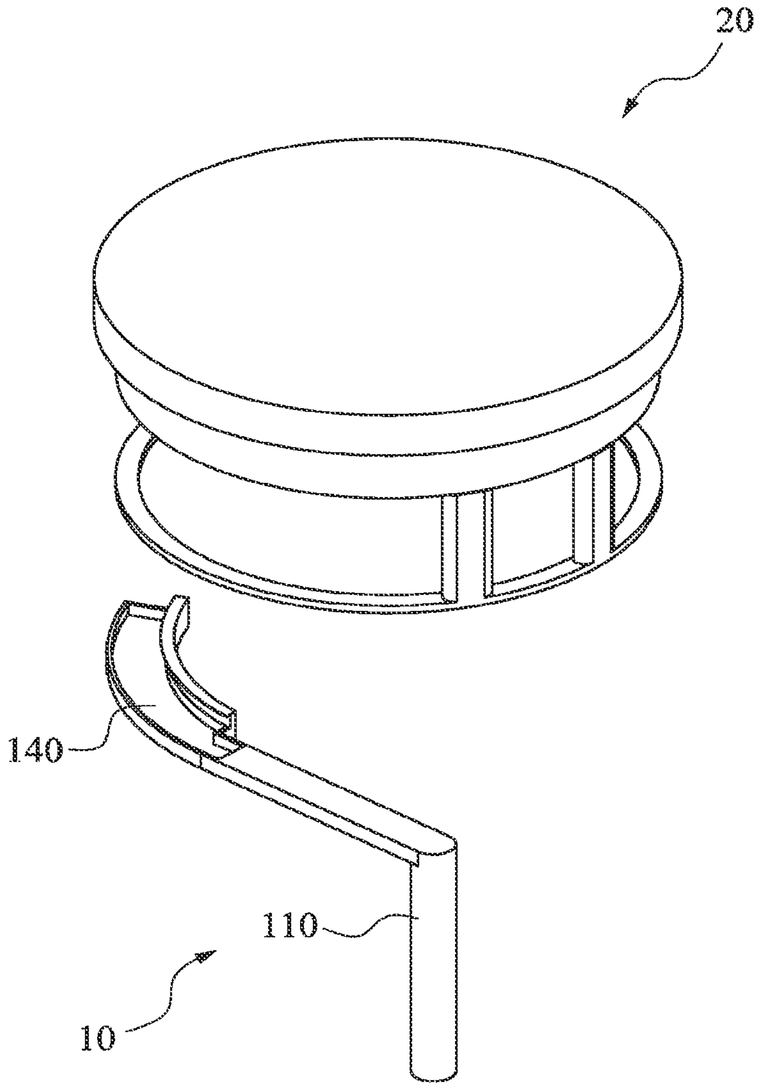
Figure 5C:
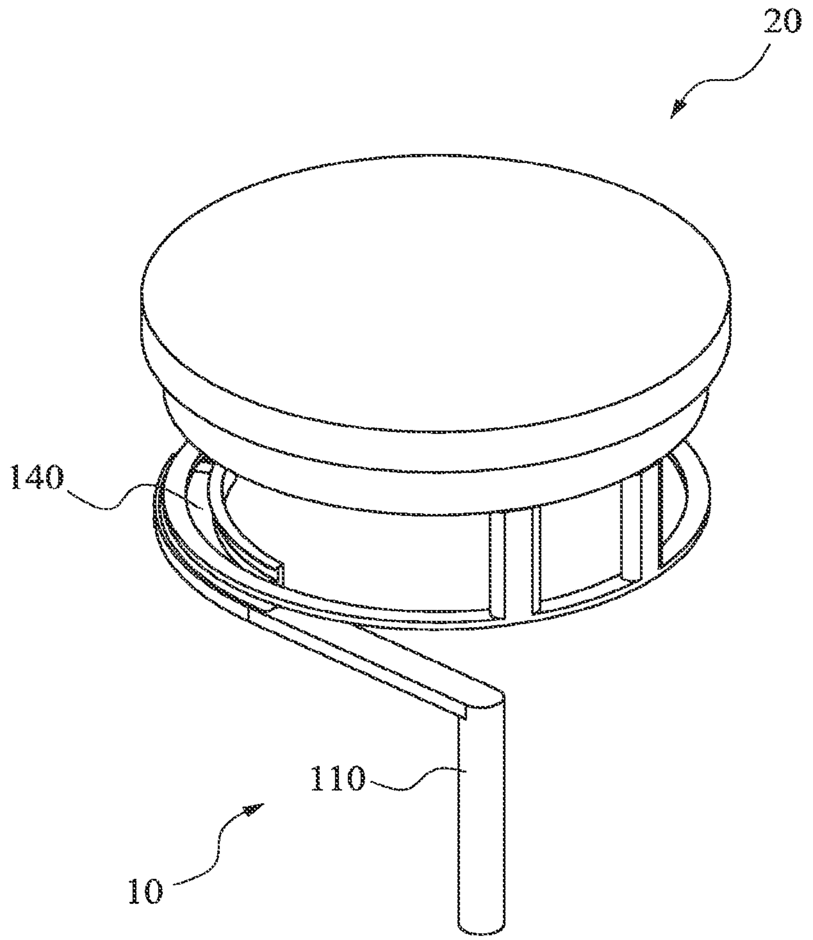
Figure 5D:
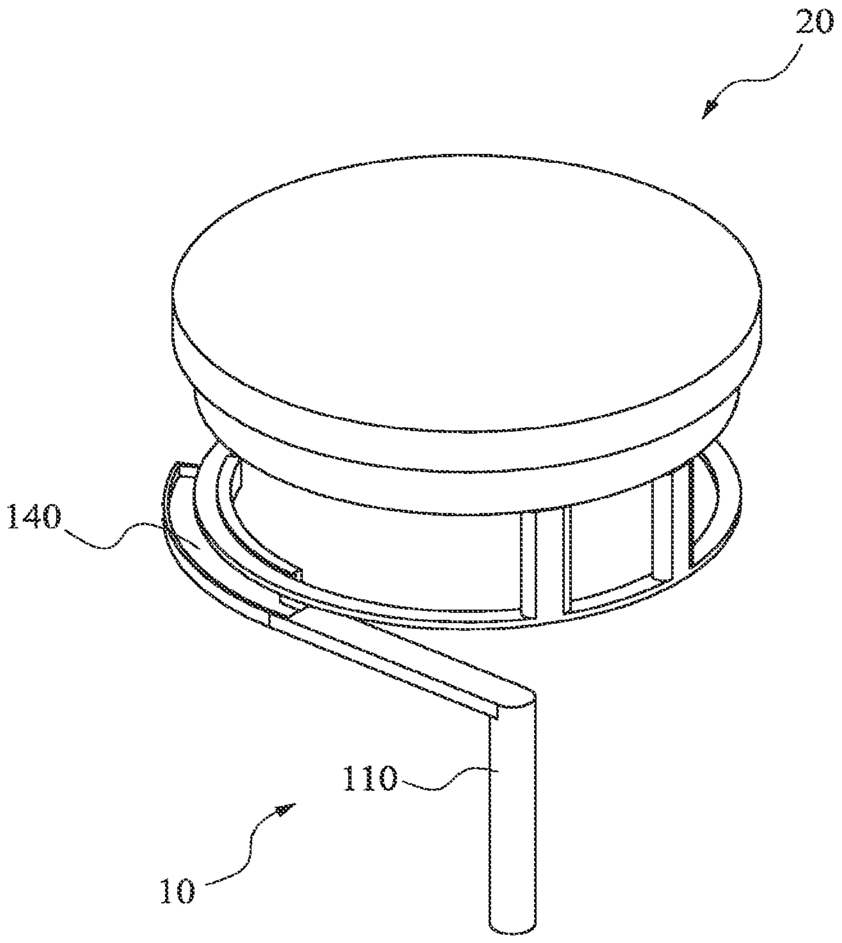

First, as shown in FIGS. 5A and 5B, the arm 110 of the cleaning device 10 is rotated (or moved) to a position beneath the substrate holder 20. Subsequently, as shown in FIGS. 5B and 5C, the substrate holder 20 is moved down to approach the cleaning device 10. In some embodiments, the substrate holder 20 is moved down to approach the receiver 140. In some embodiments, the substrate holder 20 is moved down by a motor (not shown). In some embodiments, the substrate holder 20 is moved down by a motor via a spindle (not shown). Finally, as shown in FIGS. 5C and 5D, the arm 110 is rotated (or moved) to align the nozzle (not shown) with the portion of the substrate holder 20 (e.g., the lip seal 214, the electrical contact 216, a cup bottom 212 or a combination thereof of FIG. 1). It is noted that, the processing steps of FIGS. 5A-5D is only an embodiment, and change and other methods may be utilized to align the nozzle with the portion of the substrate holder.

In operation 404, the cleaning agent is sprayed (or rinsed) onto the portion of the substrate holder 20 through the nozzle to remove the contamination, as shown in FIG. 5D. In some embodiments, the method further includes rotating the substrate holder 20 when spraying the cleaning agent onto the portion of the substrate holder 20. In some embodiments, rotating the substrate holder 20 is conducted by the spindle (not shown), which can transmits torque from the motor to the substrate holder. In some embodiments, a rotating speed of the substrate holder 20 is in a range of 0.1 rpm to 600 rpm, but not limited thereto. In some embodiments, the sidewall of the receiver 140 adjacent to the portion of the substrate holder 20 is not in contact with the portion of the substrate holder 20. In some embodiments, the nozzle is not in contact with the portion of the substrate holder 20.

In some embodiments, spraying the cleaning agent onto the portion of the substrate holder 20 includes: spraying an acid onto the portion of the substrate holder 20; spraying an dry solvent onto the portion of the substrate holder 20 after spraying the acid onto the portion of the substrate holder 20; and spraying inert gas onto the portion of the substrate holder 20 after spraying the dry solvent onto the portion of the substrate holder. The species of the cleaning agents, the spray order and the spray position may be appropriately changed in other embodiments and not limited to the embodiments exemplified above.

In some embodiments, as shown in FIG. 3B, the acid is sprayed on the lip portion 214*a* through the first nozzle 132. In some embodiments, as shown in FIG. 3B, the acid is sprayed on the lip seal 214 and the electrical contact 216 through the first, second, third nozzles 132, 134, 136. After the acid is sprayed, the dry agent is sprayed on the lip seal 214 and the electrical contact 216 through the first, second, third nozzles 132, 134, 136. After the dry agent is sprayed, the inert gas is sprayed on the lip seal 214 and the electrical contact 216 through the first, second, third nozzles 132, 134, 136.

In operation 406, the cleaning agent is received through the receiver 140 after the cleaning agent is sprayed onto the portion of the substrate holder 20, as shown in FIG. 5D. In some embodiments, the receiver 140 includes a vent (not shown) on the receiver 140, and the method further includes sucking up the cleaning agent through the vent when spraying the cleaning agent onto the portion of the substrate holder 20 or receiving the cleaning agent through the receiver 140 to avoid overflow of the cleaning agent.

According to some embodiments, a cleaning device for removing contamination on a substrate holder used with an electroplating cell includes an arm, a cleaning agent supplier, a nozzle and a receiver. The cleaning agent supplier is coupled to the arm and configured to supply a cleaning agent. The nozzle is coupled to the cleaning agent supplier and configured to spray the cleaning agent onto the substrate holder to remove the contamination. The receiver is coupled to the arm and configured to receive the cleaning agent after the cleaning agent is sprayed onto the substrate holder.

According to some embodiments, a cleaning device for removing contamination on a lip seal of a substrate holder used with an electroplating cell includes a receiver, a cleaning agent supplier, a first nozzle and a second nozzle. The receiver includes bottom, a ceiling and a sidewall between the bottom and the ceiling. The cleaning agent supplier is configured to supply a cleaning agent. The first nozzle is on the ceiling of the receiver and coupled to the cleaning agent supplier to spray the cleaning agent onto the lip seal. The second nozzle is on the sidewall of the receiver and coupled to the cleaning agent supplier to spray the cleaning agent onto the lip seal.

According to some embodiments, a method of removing contamination on a substrate holder in an electroplating cell using the cleaning device described above includes: moving the arm to align the nozzle with a portion of the substrate holder; spraying the cleaning agent onto the portion of the substrate holder through the nozzle to remove the contamination; and receiving the cleaning agent through the receiver after the cleaning agent is sprayed onto the portion of the substrate holder.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

performing an electroplating process using a substrate holder to support a substrate on which the electroplating process is performed; and after the electroplating process, removing contamination on the substrate holder, wherein removing the contamination comprises:

positioning a receiver of a cleaning device such that a first sidewall of the receiver is adjacent a lip seal of the substrate holder, wherein the first sidewall extends from a bottommost surface of the lip seal to a topmost surface of the lip seal; and spraying a cleaning agent onto a portion of the lip seal through a nozzle disposed on the receiver, wherein positioning the receiver comprises:

positioning the receiver such that a first portion of a ceiling of the receiver extending from the first sidewall overlies the portion of the lip seal and a bottom of the receiver underlies the portion of the lip seal.

2. The method of claim 1, wherein positioning the receiver comprises:

positioning the receiver such that the portion of the lip seal is disposed between the first sidewall and a second sidewall of the receiver.

3. The method of claim 1, wherein positioning the receiver comprises:

positioning the receiver such that the portion of the lip seal is disposed between the first sidewall and a second sidewall of the receiver and such that a second portion of the ceiling of the receiver extending from the second sidewall overlies the portion of the lip seal.

4. The method of claim 1, comprising:

rotating the substrate holder while spraying the cleaning agent onto the portion of the lip seal.

5. The method of claim 1, wherein spraying the cleaning agent comprises:

spraying an acid onto the portion of the lip seal during a first time interval, and spraying a dry solvent onto the portion of the lip seal during a second time interval different than the first time interval.

6. The method of claim 5, wherein spraying the cleaning agent comprises:

spraying an inert gas onto the portion of the lip seal during a third time interval different than the first time interval and the second time interval.

7. The method of claim 6, wherein:

the second time interval is after the first time interval, and the third time interval is after the second time interval.

8. The method of claim 1, wherein spraying the cleaning agent comprises:

spraying an acid onto the portion of the lip seal during a first time interval, and spraying an inert gas onto the portion of the lip seal during a second time interval different than the first time interval.

9. The method of claim 1, comprising:

sucking up the cleaning agent through a vent disposed in the receiver after spraying the cleaning agent onto the portion of the lip seal.

10. The method of claim 9, wherein the vent is disposed on a portion of the receiver underlying the portion of the lip seal.

11. The method of claim 1, wherein spraying the cleaning agent comprises spraying the cleaning agent through the nozzle configured to emit the cleaning agent in a first direction and through a second nozzle configured to emit the cleaning agent in a second direction perpendicular to the first direction.

12. A method of removing contamination on a substrate holder in an electroplating cell, the method comprising:

positioning a receiver of a cleaning device relative to the substrate holder such that a portion of the substrate holder to be cleaned is disposed between a first sidewall of the receiver and a second sidewall of the receiver while concurrently being spaced apart from the first sidewall and the second sidewall; and spraying a cleaning agent onto the portion of the substrate holder to be cleaned through a nozzle disposed on the receiver to remove the contamination.

13. The method of claim 12, wherein positioning the receiver of the cleaning device relative to the substrate holder comprises:

driving the substrate holder toward the receiver.

14. The method of claim 12, wherein positioning the receiver comprises:

positioning the receiver such that a first portion of a ceiling of the receiver extending from the first sidewall overlies the portion of the substrate holder to be cleaned and a bottom of the receiver underlies the portion of the substrate holder to be cleaned.

15. The method of claim 14, wherein positioning the receiver comprises:

positioning the receiver such that a second portion of the ceiling of the receiver extending from the second sidewall overlies the portion of the substrate holder to be cleaned.

16. The method of claim 12, wherein spraying the cleaning agent comprises:

spraying a first solution onto the portion of the substrate holder to be cleaned during a first time interval, and spraying a second solution onto the portion of the substrate holder to be cleaned during a second time interval after than the first time interval.

17. The method of claim 12, wherein spraying the cleaning agent comprises:

spraying the cleaning agent in a first direction and a second direction different than the first direction.

18. A method comprising:

performing an electroplating process using a substrate holder to support a substrate on which the electroplating process is performed; and after the electroplating process, removing contamination on the substrate holder, wherein removing the contamination comprises:

positioning a receiver comprising a nozzle from which a cleaning agent is sprayed such that a first portion of a ceiling of the receiver extending from a first sidewall of the receiver overlies a portion of the substrate holder being cleaned and a bottom of the receiver underlies the portion of the substrate holder being cleaned; and rotating the substrate holder while spraying the cleaning agent onto the substrate holder in a first direction perpendicular to a bottom surface of the substrate holder and a second direction at least one of perpendicular to or diametrically opposite to the first direction.

19. The method of claim 18, wherein the second direction is diametrically opposite to the first direction.

20. The method of claim 18, comprising:

sucking up the cleaning agent through a vent disposed in the receiver after spraying the cleaning agent onto the substrate holder.

* * * * *